June 1, 1965   E. R. BOLDRINI ET AL   3,186,889
METHOD OF MAKING A LAMINATED MATERIAL
Filed Dec. 19, 1960

INVENTOR.
E. R. Boldrini.
BY

# 3,186,889
METHOD OF MAKING A LAMINATED MATERIAL
Elvio R. Boldrini, Kearny, and Julian J. Pruszkowski, Union, N.J., assignors to Interchemical Corporation, New York, N.Y., a corporation of Ohio
Filed Dec. 19, 1960, Ser. No. 76,621
3 Claims. (Cl. 156—333)

This invention relates to laminated materials. More particularly, it is concerned with novel vinyl film-fabric based laminates wherein said vinyl film is bonded to the fabric base by water containing plastisol or organosol adhesive material.

Vinyl film or sheet, fabric based laminates are presently used in the manufacture of many products wherein a protective layer covering a base fabric is desirable. These products include table cloths, items of apparel subject to weathering conditions and upholstered products among others. As is obvious from uses to which these laminates are put, a high degree of flexibility and a very strong bond between the vinyl film and the base material is required of them. Existing laminates of this type have, however, remained somewhat deficient in providing a desirable combination in these two properties. Where a strong bond is provided in existing laminates, flexibility is usually impaired to some degree. On the other hand, where a flexible laminate is provided, the strength of the bond is less than desirable.

There has now been found a novel fabric based, vinyl film covered laminate having both a high degree of flexibility and an excellent bond between the vinyl film and the fabric base.

In accordance with this invention, there is provided a laminate essentially comprising a fabric base and vinyl sheet of film layer covering said base. The fabric and vinyl film are bonded together by an adhesive sandwiched between them, said adhesive being formed by fusing an adhesive layer comprising either plastisols or organosols containing 1%–25% of water.

Organosols are dispersions which are colloidal sols of substantially insoluble resin particles in volatile organic liquid dispersion media. In addition, organosols usually contain plasticers. Plastisols are systems similar to organosols, but having only non volatile plasticizers as dispersion media and no volatile components.

As has been stated hereinabove, existing laminates which usually employ water soluble adhesives or organic solvent soluble adhesive have provided less than desirable flexibilities and/or bond strengths. It has now been found that by employing plastisols or organosols which contain water as adhesives, the deficiencies of existing laminates are substantially overcome. Upon the curing of the adhesive, the water acts as a blowing agent, producing a foam-like film structure. This provides a high degree of flexibility. In addition, the blowing causes the adhesive to expand and envelop the fibers of the fabric to produce a superior bond. Further, adhesives having water containing plastisols and organosols are less costly to produce than ordinary plastisol and organosol adhesives.

With reference to the base fabric used, there are no limitations as to suitable fabrics except that the fabrics must be flexible and have desirable strength. Cotton, flannel back and Osnaberg as well as synthetic fabrics have been found to be very suitable.

The vinyl coverings preferred in the practice of this invention are flexible vinyl plastic sheets and films which are well known to those skilled in the art.

With respect to the adhesive materials employed, the plastisol may employ any of the conventional primary plasticizers used in existing plastisols. The following plasticizers have been found to have the general requirements for a primary plasticizer; phthalates such as dimethyl phthalate and dioctyl phthalate, adipates such as dioctyl adipate; phosphates such as tricresyl phosphate and 2-biphenyl diphenyl phosphate as well as chlorinated biphenyls and methyl phthalyl ethyl glycollate, and combinations of the above plasticizers. Other plasticizers which exhibit compatibility with polyvinyl chloride and which may be used will be readily apparent to those skilled in the art. In addition to the primary plasticizers, secondary plasticizers may be optionally used. These include chlorinated biphenyl, chlorinated paraffin, distilled methyl esters of tall oil and various petroleum derivatives among others.

While copolymers of vinyl chloride and vinyl acetate or vinyl chloride polymers are preferably employed as the dispersed phase in the adhesive, it will be obvious to those skilled in the art that any insoluble or difficultly soluble vinyl chloride containing resin may be used. These include copolymers of vinyl chloride and dibutyl maleate, ethyl or methyl acrylate, butyl or methyl methacrylate as well as acrylonitrile.

Where organosols are employed as the adhesive, the same constituents are employed as in a plastisol along with a voltaile organic liquid which acts as the dispersion medium for the insoluble dispersed resin. While a combination of petroleum naphtha and diisobutyl ketone is used as the organic liquid dispersion medium in the illustrative examples which follow, other conventional organosol dispersion media may be used and these will be readily obvious to those skilled in the art. These include toluene, xylene, methyl isobutyl ketone, alkanols and petroleum naphthas. The properties required of the organic liquid are that the dispersed resin must be insoluble therein and the liquid must be sufficiently volatile to evaporate on curing.

Stabilizers such as lecithin and other conventional plastisol and organosol ingredients may be included if desired.

It has been found that desirable adhesives should contain from 1%–25% by weight of water. Increasing the amount of water beyond this limit results in a progressive downgrading of the bond strength.

The proportion of the plasticizer used is not critical and may be varied considerably. For the best results, 0.5 to 2.5 parts by weight of plasticizer used for each part of dispersed resin.

In producing the laminated material of this invention, a thin layer of plastisol or organosol adhesive is applied to the vinyl film by means of a knife coater or gravure roller.

Figure 1:
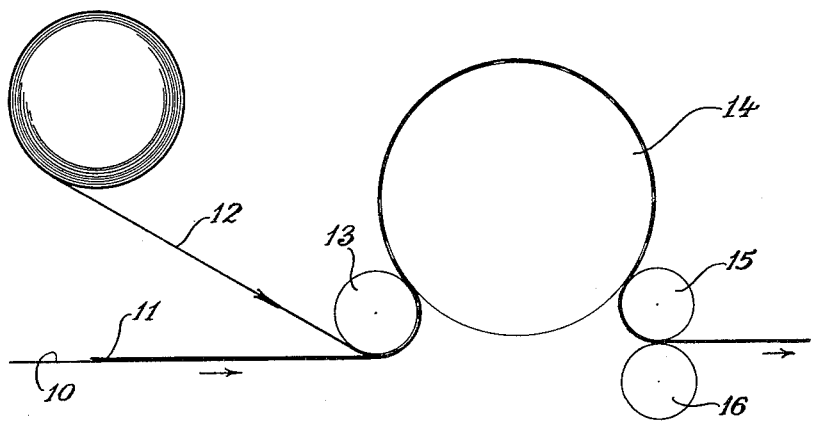
FIGURE 1 is a diagrammatic view of laminating apparatus used to produce the material of this invention.

Referring now to FIG. 1, vinyl film 10 carries adhesive layer 11. Fabric 12 is layered onto the exposed surface of adhesive layer 11, thus joining film 10 and fabric 12. The adhesive joined film and fabric are then passed between heated roller 13 and heated drum 14, over drum 14 and between heated rollers 15 and 16, said rollers and drum being heated to a temperature between 240°–300° F. The heating fuses the adhesive thereby laminating the vinyl film to said fabric.

Figure 2:
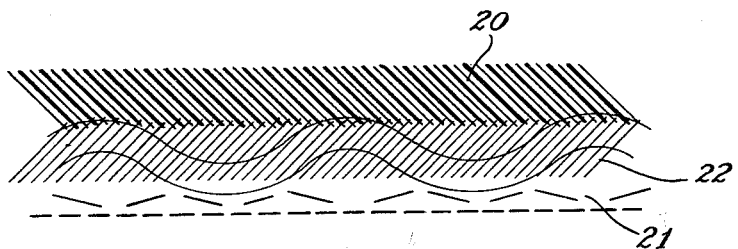
FIGURE 2 is a longitudinal central sectional view of the laminated material.

FIGURE 2 is a central sectional view of the laminated material of this invention. Vinyl film 20 is laminated to fabric base 21 by adhesive 22.

The following examples will illustrate the practice of this invention.

Example 1

| | Parts by weight |
|---|---|
| (A) Dioctyl phthalate | 24.4 |
| (B) 40% chlorinated paraffin | 24.4 |
| (C) Pliovic AO (a product of Goodyear Tire & Rubber Co. containing 95% vinyl chloride and 5% vinyl acetate) | 26.2 |
| (D) Lecithin | 0.5 |
| (E) Water | 24.5 |

Ingredient C is slowly added to a mixture of A, B and D in a dough mixer while continually mixing the ingredients until C is completely dispersed in the mixture. E is then added while the mixing is continued.

A film of the resulting adhesive composition is applied and spread on a vinyl sheet by means of a knife coated or gravure roller. A fabric substrate is brought in contact with the adhesive coated surface of said vinyl sheet and laminated thereto by passing the sheet and fabric over rollers heated to 240°–300° F.

Example 2

| | Parts by weight |
|---|---|
| (A) Dioctyl phthalate | 31.0 |
| (B) 40% chlorinated paraffin | 31.0 |
| (C) Pliovic AO | 33.0 |
| (D) Water | 5.0 |

Ingredient C is slowly added to a mixture of A and B in a dough mixer and the procedure of Example 1 is repeated.

Example 3

| | Parts by weight |
|---|---|
| (A) Dioctyl phthalate | 24.4 |
| (B) 40% chlorinated paraffin | 24.4 |
| (C) Pliovic AO | 26.2 |
| (D) A solution of 9 parts by weight of an aliphatic hydrocarbon solvent having a K.B. value of 43 and a boiling range of 311°–391° F. to 1 part of diisobutyl ketone | 5.0 |
| (E) Water | 20.0 |

Ingredient C is slowly added to a mixture of A and B in a dough mixer while continually mixing the ingredients until C is completely dispersed in the mixture. D and E are then added while the mixing is continued.

A film of the resulting mixture is applied and spread on a vinyl sheet by means of a knife coater. A fabric substrate is brought into contact with the adhesive coated surface of said vinyl sheet and laminated thereto by passing the sheet and the fabric over rollers heated to 240°–300° F.

Example 4

| | Parts by weight |
|---|---|
| (A) Dioctyl phthalate | 22.4 |
| (B) 40% chlorinated paraffin | 22.4 |
| (C) Pliovic AO | 30.2 |
| (D) A solution of 9 parts by weight of an aliphatic hydrocarbon solvent having a K.B. value of 43 and a boiling range of 311°–391° F. to 1 part of diisobutyl ketone | 10.0 |
| (E) Water | 15.0 |

The process described in Example 3 is repeated with the above ingredients.

It will be understood that it is intended to cover all changes and modifications of the examples of the invention herein chosen for the purpose of illustration which do not constitute departures from the spirit and scope of the invention.

What is claimed is:

1. The method of making a laminated material which comprises, applying a layer of adhesive material, including a member selected from the group consisting of plastisols and organosols containing a copolymer of vinyl chloride and vinyl acetate having a predominant proportion of vinyl chloride copolymerized therein and 1% to 25% by weight of water, to at least one surface of a sheet of vinyl plastic, placing a fabric in contact with the free surface of said adhesive layer and heating said adhesive material until it is cured, thereby bonding said vinyl plastic sheet to said fabric.

2. The method of claim 1 wherein said selected member is the organosol.

3. The method of claim 1 wherein said selected member is the plastisol.

References Cited by the Examiner

UNITED STATES PATENTS

| | | | |
|---|---|---|---|
| 2,700,630 | 1/55 | Bukey et al. | 154—46 |
| 2,706,699 | 4/55 | Plansoen et al. | 161—254 |
| 2,823,156 | 2/58 | Hedges | 154—46 |
| 2,864,777 | 12/58 | Greenhoe | 154—Vinyl |
| 2,894,855 | 7/59 | Wilhelm et al. | 117—103 |
| 2,918,702 | 12/59 | Wetterau | 154—Vinyl |
| 2,943,949 | 7/60 | Petry | 117—11 |
| 2,946,095 | 7/60 | Beer | 260—2.5 |
| 2,956,310 | 10/60 | Roop et al. | 154—PB |
| 2,961,332 | 11/60 | Nairn | 154—Vinyl |
| 2,966,470 | 12/60 | Maltenfort | 260—2.5 |
| 3,087,848 | 4/63 | Rash | 156—280 |
| 3,132,065 | 5/64 | Barsy et al. | 161—165 |

EARL M. BERGERT, *Primary Examiner.*

C. F. KRAFFT, *Examiner.*